United States Patent
Gärtner et al.

(10) Patent No.: US 7,541,086 B2
(45) Date of Patent: Jun. 2, 2009

(54) BEARING ELEMENT

(75) Inventors: Walter Gärtner, Gmunden (AT);
Manfred Kienberger, Pettenbach (AT);
Hubert Lang, Au an der Donau (AT)

(73) Assignee: Miba Gleitlager GmbH, Laakirchen (AT)

( * ) Notice: Subject to any disclaimer, the term of this patent is extended or adjusted under 35 U.S.C. 154(b) by 0 days.

(21) Appl. No.: 11/522,033

(22) Filed: Sep. 15, 2006

(65) Prior Publication Data

US 2007/0065067 A1 Mar. 22, 2007

(30) Foreign Application Priority Data

Sep. 16, 2005 (AT) .............. A 1532/2005

(51) Int. Cl.
- *B32B 15/08* (2006.01)
- *B32B 15/088* (2006.01)
- *B32B 15/092* (2006.01)
- *B32B 27/06* (2006.01)
- *B32B 7/00* (2006.01)

(52) U.S. Cl. .............. 428/212; 428/323; 428/327; 428/328; 428/329; 428/330; 428/331; 428/413; 428/418; 428/421; 428/422; 428/423.1; 428/457; 428/458; 428/461; 428/463; 428/473.5; 428/474.4; 428/524; 384/276; 384/297; 384/299; 384/300; 384/445; 384/462; 384/463; 384/907

(58) Field of Classification Search ............... None
See application file for complete search history.

(56) References Cited

U.S. PATENT DOCUMENTS

| | | | | |
|---|---|---|---|---|
| 3,647,500 A * | 3/1972 | Mizuno | ............... | 428/143 |
| 4,206,268 A * | 6/1980 | Roemer et al. | ............... | 428/643 |
| 4,363,854 A | 12/1982 | Hodes et al. | | |
| 4,511,606 A * | 4/1985 | Ehrlich et al. | ............... | 427/386 |
| 4,961,831 A * | 10/1990 | Bergmann et al. | ..... | 204/192.16 |
| 5,171,622 A | 12/1992 | Wegner | | |
| 5,300,368 A * | 4/1994 | Kubert et al. | ............... | 428/610 |
| 5,525,246 A * | 6/1996 | Kamiya et al. | ............... | 508/103 |
| 6,305,847 B1 * | 10/2001 | Tanaka et al. | ............... | 384/297 |
| 6,450,594 B1 * | 9/2002 | Ketting et al. | ............... | 305/203 |
| 6,506,503 B1 * | 1/2003 | Mergen et al. | ............... | 428/650 |
| 6,655,842 B2 * | 12/2003 | Kanayama et al. | ......... | 384/276 |
| 6,723,184 B2 * | 4/2004 | Sato et al. | ................... | 148/438 |
| 6,802,649 B2 * | 10/2004 | Kawagoe et al. | ............. | 384/276 |
| 6,863,994 B2 * | 3/2005 | Tanaka et al. | ............... | 428/626 |
| 6,866,421 B2 * | 3/2005 | Tanaka et al. | ............... | 384/300 |
| 7,255,933 B2 * | 8/2007 | Sato et al. | ................... | 428/674 |
| 2003/0180572 A1 * | 9/2003 | Norito et al. | ................ | 428/673 |
| 2004/0142199 A1 * | 7/2004 | Bickle et al. | ................ | 428/553 |
| 2005/0003225 A1 * | 1/2005 | Gartner | ..................... | 428/610 |
| 2006/0245675 A1 * | 11/2006 | Lang | .......................... | 384/95 |

FOREIGN PATENT DOCUMENTS

| | | |
|---|---|---|
| AT | 394 681 B | 5/1992 |
| AT | 407 404 B | 3/2001 |

(Continued)

*Primary Examiner*—Vivian Chen
(74) *Attorney, Agent, or Firm*—Collard & Roe, P.C.

(57) ABSTRACT

The invention describes a bearing element (1), comprising a protective layer (2), a bearing metal layer (3) applied over the protective layer (2) and a sliding layer (4) applied by sputtering over the bearing metal layer (3). A sliding paint layer (5) is applied onto the sliding layer (4).

19 Claims, 1 Drawing Sheet

FOREIGN PATENT DOCUMENTS

| | | |
|---|---|---|
| EP | 0 265 937 A2 | 5/1998 |
| EP | 0 272 447 A2 | 6/1998 |
| EP | 1 065 138 A2 | 6/2000 |
| EP | 1 236 914 * | 9/2002 |
| EP | 1 342 806 | 9/2003 |
| GB | 2 056 882 * | 3/1981 |
| GB | 2 345 095 | 6/2000 |

* cited by examiner

BEARING ELEMENT

CROSS REFERENCE TO RELATED APPLICATIONS

Applicants claim priority under 35 U.S.C. §119 of AUSTRIAN Patent Application No. A 1532/2005 filed on Sep. 16, 2005.

BACKGROUND OF THE INVENTION

1. Field of the Invention

The invention relate to a bearing element comprising a protective layer, a bearing metal layer applied over the protective layer and a sliding layer applied by sputtering over the bearing metal layer, and a method for producing the bearing element.

2. The Prior Art

Technical progress made in the motor industry means that ever increasing demands are made on bearing elements, e.g. sliding bearings. Single layer sliding bearings can no longer satisfy requirements, for example resistance to corrosive wear, due to a layer of oil that thins at high speeds, so that the sliding bearing industry is increasing turning to multiple layer sliding bearings. The latter generally consist of a steel protective coating onto which one or more additional layers are applied by rolling on, plating or sputtering. The additional layers are the bearing metal layer, which if necessary is secured onto the steel protective layer with the insertion of a bonding layer. The sliding layer made from an alloy, for example an aluminium alloy with a higher or lower zinc content or a sliding paint is applied onto said bearing metal layer, if necessary with the interspersion of a bonding layer or diffusion barrier layer.

The intention of these kinds of series of coatings for tribologically stressed components or surfaces is on the one hand to achieve higher ignition pressures for improved thermodynamics and as a result reduced consumption or reduced amounts of exhaust. On the other hand the motor industry now requires lighter engines in addition to increased efficiency, i.e. specific performance, and thereby greater economic savings and greater environmental friendliness of combustion engines, with the result that individual components need to have smaller dimensions. At the same time, in particular at higher temperatures, more dilute lubricating oils need to be used in order to obtain lower frictional power. The required lifetime for motor vehicles, in particular utility vehicles, is at least approx. 1 million kilometres and the intervals between service inspections will also become longer, so that opportunities to inspect sliding elements and their wear are reducing. In other words the average lifetime of a sliding element needs to be increased significantly.

These demands result in a higher specific loading of the sliding elements and higher dynamic stresses. Additionally, smaller lubricating gaps are formed which results in increased and more intensive semi-fluid friction. The result of this can be that boundary friction occurs locally, e.g. on edges, and no bearing lubricant film is formed locally. Owing the reduced dissipation of heat generated by the combustion process local temperature peaks can occur which can damage sliding bearing layers at least in some areas or influence the lifetime of a sliding bearing.

SUMMARY OF THE INVENTION

On this basis the objective of the invention is to provide a sliding element which satisfies these requirements.

This objective of the invention is achieved independently by a bearing element, which is designed as a so-called sputter bearing and which has a sliding paint layer as the fourth layer over the sputter layer, and by a method for producing this bearing element in which after the sputtering method to precipitate the sliding layer an additional sliding paint layer is applied onto the bearing metal layer.

In principle, the method to reduce the tribological disadvantages of a fixed layer by applying an additional soft layer is known, but is not effective in achieving the present objective because the localised adaptation to geometry is achieved by removing the soft layer, and with boundary friction a greater degree of wear and thereby a short lifetime can be anticipated. Furthermore, metal layers soften at higher temperatures so that particles are dragged away then accumulate and reharden in areas of lower temperature due to the inner affinity of the material. This results in damage to the lubricating gap geometry which is greater the thicker the layer. Furthermore, with the present objective the frictional factor of metal layers has proved to be too high. It has also been found that a sliding paint cannot survive the required lifetime on conventional bases of sliding elements.

The combination according to the invention of a sputter layer as the sliding layer or contact layer and a sliding paint layer applied over the top has the advantage that the sliding paint layer, which is designed as a wearing-in layer, is worn not just locally but the base is also deformed by dynamic stresses. Therefore, both layers are involved in the adjustment in the running-in phase and the wear rate of the wearing-in layer is thus significantly reduced in this way. In principle, this is a differently acting mechanism than in conventional bearing elements. It is thus also possible that only the base, i.e. the sliding or contact layer is deformed without the sliding paint layer being deformed plastically. In the bearing element according to the invention no areas are observed in which removed particles of the running in or sliding layer accumulate so that the geometry of the lubricating gap remains essentially the same. It is thus also possible to design the sliding paint layer as a thin layer. Compared to conventional sliding layers, especially sputtered layers, it is possible to achieve greater adaptability to the element to be supported, for example a shaft. It is also an advantage that the sliding paint layer can be applied directly onto the sliding layer, i.e. a nickel layer, commonly used in conventional sliding bearings known from the prior art, is no longer necessary as a diffusion barrier, so that a bearing element according to the invention is improved not only with respect to its mechanical properties over known multiple layer sliding bearings but also there is a corresponding financial advantage to be achieved in producing the bearing element according to the invention.

The sliding paint layer can have anisotropic properties, and particularly in loading direction, i.e. in the direction perpendicular to the layers, can permit a high mechanical load at the same time as low shearing strength in a direction parallel to the sliding paint layer.

The sliding paint layer can contain a thermoplastic resin as it main constituent, whereby said thermoplastic resin is selected in particular from a group comprising polyimides, in particular aromatic ones, polyamide imides, in particular aromatic ones, polyaryl ether imides, if necessary modified with isocyanates, phenolic resins, polyaryl ether-ether ketones, polyamides, in particular aromatic ones, epoxy resins, polytetrafluoroethylene, fluorine-containing resins, such as e.g. polyfluoroalkoxy-polytetrafluoroethlene-copolymers, ethylene-tetrafluoroethylene, fluoridated ethylene propylene copolymers, polyvinylidene difluoride, polyvinyl fluoride, allylene sulphide, polytriazo-pyromelliticimides, polyester imides, polyaryl sulphides, polyvinyl sulphides, polysulphones, polyarylsulphones, polyaryl oxides, copolymers and mixtures thereof, such as e.g. polyimides and/or polyamide imides and/or polyaryl ether imides and/or phenolic resins and/or polyarylether-ether ketones and/or polyamides and/or epoxy resins and/or polytetrafluoroethylene and/or fluorine-containing resins, such as e.g. polyfluoroalkoxy-polytetrafluoroethylene-copolymers, ethylene-tetrafluoroethylene, fluoridated ethylene propylene copolymers, polyvinylidene difluoride, polyvinyl fluoride, allylene sulphide and/or poly-triazo-pyro-mellitic imide and/or polyester imide and/or polyvinyl sulphide and/or polysulphones and/or polyaryl sulphones and/or polyaryl oxides with polyimides and/or polyamide imides and/or polyaryl ether imides and/or phenolic resins and/or polyarylether-ether ketones and/or polyamides and/or epoxy resins and/or polytetrafluoroethylene and/or fluorine-containing resins, such as e.g. polyfluoroalkoxy-polytetrafluoroethylene copolymers, ethylene-tetrafluoroethylene, fluoridated ethylene-propylene copolymers, polyvinylidene difluorides, polyvinyl fluorides and/or allylene sulphides and/or poly-triazo-pyromellitic imides and/or polyester imides and/or polyaryl sulphides and/or polyvinyl sulphides and/or polyaryl sulphones and/or polyaryl oxides.

The advantage here is that by means of the sliding paint layer consisting mainly of the thermoplastic resin or resin mixtures or copolymers a cyclical temperature-dependent softening and hardening mechanism is provided, which can increase the lifetime of the sliding paint layer. It is also advantageous that by means of the specifically listed resins or resin mixtures or copolymers it is possible to adapt the bearing function to various different loads, so that for example expensive types of resin can be used only for highly loadable bearing elements and as a result there is a cost advantage for bearing elements that are loaded to a lesser degree.

The amount of resin in the sliding paint can be selected from a range with a lower limit of 30% and an upper limit of 95%. This permits a variation in the transmissibility of the deformation to the base so that the adaptability of the sliding paint layer, in particular in the wearing in phase, can be more easily suited to the respective requirements.

In order to improve this effect even further according to further developments of the invention it is possible to select the proportion of resin in the sliding paint layer from a range with a lower limit of 50 wt. % and an upper limit of 85 wt. % or from a range with a lower limit of 70 wt. % and an upper limit of 75 wt. %.

The thermoplastic resin can contain at least one additive, selected from a group comprising lubricants, in particular. $MoS_2$, h-BN, $WS_2$, graphite, polytetrafluoroethylene, Pb, Pb—Sn alloys, $CF_2$, $PbF_2$, also hard materials such as e.g. $CrO_3$, $Fe_3O_4$, PbO, ZnO, CdO, $Al_2O_3$, SiC, $Si_3N_4$, $SiO_2$, $Si_3N_4$, also clay, talc, $TiO_2$, mullite, $CaC_2$, Zn, AlN, $Fe_3P$, $Fe_2B$, $Ni_2B$, FeB, metal sulphides, such as e.g. ZnS, $Ag_2S$, CuS, FeS, $FeS_2$, $Sb_2S_3$, PbS, $Bi_2S_3$, CdS, fibres, in particular inorganic fibres, such as e.g. glass, carbon, potassium titanite, whiskers, for example SiC, metal fibres, for example made of Cu or steel as well as mixtures thereof, such as e.g. at least one lubricant, particularly of the said kind and/or at least one hard material, in particular of the said kind and/or at least one metal sulphide, in particular of the said kind, and/or at least one fibre-shaped additive, in particular of the said kind, with at least one lubricant and/or a hard material and/or a metal sulphide and/or at least one fibre-shaped additive, all in particular of the said kind.

In this way the topography of the sliding paint layer, for example the surface roughness can be influenced, and in the end it is possible to influence the behaviour of the sliding paint with respect to friction. In particular, with the at least one lubricant the sliding paint can be given greater sliding ability and with the at least one hard material or the at least one fibre-shaped additive the hardness of the sliding paint can be varied, in particular the wear resistance of the sliding paint layer and/or the friction factor of the sliding paint layer can be influenced and improved.

It is an advantage if the sliding paint layer contains at least one additive with a platelet like disposition, as in this way the anisotropy of the properties of the sliding paint—and thereby the levelling properties of the sliding paint—can be improved so that the proportion of boundary friction compared to semi-fluid friction is pushed significantly into the background.

The additive is preferably added in an amount selected from a range with a lower limit of 5% and an upper limit of 30% and these limits can also be used for mixtures of different additives in order to increase the said effects further.

It is an advantage in this case if the additive is added in an amount selected from a range with a lower limit of 10% and an upper limit of 25% or in a further embodiment in an amount selected from a range with a lower limit of 15% and an upper limit of 20%, whereby a further improvement of the above effects can also be achieved.

The at least one additive preferably has a particle size selected from a range with a lower limit of 0.5 µm and an upper limit of 20 µm. In this given range of particle size a balanced ratio is achieved between the peak decomposition, i.e. the levelling of the sliding paint layer and/or the surface of an element to be mounted, for example a shaft, and reduced friction on forming the additive as the lubricant.

In order to improve this effect further it is advantageous if the at least one additive has a particle size selected from a range with a lower limit of 2 µM and an upper limit of 10 µm or in a further variant of the embodiment from a range with a lower limit of 3 µm and an upper limit of 5 µm.

It is particularly advantageous if the at least one additive is molybdenum disulphate particles with an average length selected from a range with a lower limit of 10 µm and an upper limit of 40 µm and/or an average width selected from a range with a lower limit of 10 µm and an upper limit of 40 µm and/or an average height selected from a range with a lower limit of 2 nm and an upper limit of 20 nm, the molybdenum disulphide particles having an essentially platelet like disposition, which means that the $MoS_2$ platelets are aligned at least partly perpendicular to the direction of movement and thereby allow the following particles to more or less "run on" so that wear can be reduced in this way.

For a further improvement of this effect it is an advantage if the molybdenum disulphide according to embodiment variants has a particle size with a length selected from a range with a lower limit of 15 µm and an upper limit of 35 µpm and/or an average width selected from a range with a lower limit of 15 µm and an upper limit of 35 µm and/or an average height, selected from a range with a lower limit of 5 nm and an upper limit of 15 nm or an average length of particles selected from a range with a lower limit of 18 µm and an upper limit of 25 µm and/or an average width selected from a range with a lower limit of 18 µm and an upper limit of 25 µm and/or an average height selected from a range with a lower limit of 5 nm and an upper limit of 8 nm.

In order to be able to vary the self-lubricating behaviour of the sliding paint layer over broad limits it is possible for at least one additive to be graphite, in particular with a particle size selected from a range with a lower limit of 2 µm and an upper limit of 8 µm.

The sliding paint layer can have a layer thickness, selected from a range with a lower limit of 2 µm and an upper limit of 40 μm or according to a further development with a lower limit of 5 μm and an upper limit of 20 μm or according to a further embodiment variant with a lower limit of 10 μm and an upper limit of 15 μm, whereby the bearing element can be adjusted in turn to the chosen application, e.g. large bearing or small bearing, and in this way a corresponding optimisation of cost can be achieved at the same time as providing long term reliable uniform properties for the bearing element.

It is particular advantageous if the sliding paint is a polyimide resin, in particular a polyamide imide resin, which contains molybdenum disulphide and graphite, whereby the amount of polyimide resin in solvent is selected from a range with a lower limit of 60% and an upper limit of 80%, the amount of $MoS_2$ selected from a range with a lower limit of 15% and an upper limit of 25% and the amount of graphite selected from a range with a lower limit of 5% and an upper limit of 15%, as with this composition surprisingly despite the high proportion of $MoS_2$ and graphite in the polyimide resin an unexpected improvement in the wearing resistant of the bearing element is made possible. It is unexpected as with a lesser amount of polyimide resin, which can be considered to be the binding agent for the friction-reducing additives, it would be expected that that the cohesion of the layer would be made worse and that the latter would finally "crumble". By using the selected proportions of $MoS_2$ and graphite, in particular the ratio of the amount of $MoS_2$ to graphite, this does not occur and the Applicant is not able to provide a theory to explain this at the present time. However, it is assumed that there is an interaction between the $MoS_2$ and graphite particles.

In this way it is also possible to improve the cavitation behaviour and a reduced susceptibility of the bearing element to corrosion is also established.

For further improvement of these properties it is possible for the amount of polyimide resin in solvent to be selected from a range with a lower limit of 65% and an upper limit of 75% or a lower limit of 67.5% and an upper limit of 72.5% or the amount of the polyimide resin in solvent to be in particular 70%, also for the proportion of $MoS_2$ to be selected from a range with a lower limit of 17% and an upper limit of 22% or a lower limit of 18.5% and an upper limit of 21.5% or 20% or also the amount of graphite to be selected from a range with a lower limit of 7% and an upper limit of 13% or from a range with a lower limit of 8.5% and an upper limit of 11.5% or 10%.

In is particularly advantageous if the ratio of $MoS_2$ to graphite is selected from a range with a lower limit of 1.5:1 and an upper limit of 4.5:1, in order thereby to vary the behaviour of the sliding paint layer over broad limits and thus also improve the run-in properties.

The sliding layer can be designed to have a layer thickness selected from a range with a lower limit of 10 μm and an upper limit of 30 μm or a lower limit of 12 μm and an upper limit of 20 μm or with a lower limit of 15 μm and an upper limit of 17 μm. It is a particular advantage if the ratio of the layer thickness of the sliding layer to the layer thickness of the sliding paint layer is selected from a range with a lower limit of 2:1 and an upper limit of 5:1. By means of said layer thickness ratio and the given layer thickness ranges there is an improvement in the effect, that the running in layer is not only worn away locally but the base is also deformed by dynamic stresses and thus both layers contribute to the adjustment during the running in phase. Furthermore, the long term strength of the bearing element is improved by means of the thickness chosen for the sliding layer.

According to one embodiment variant the ratio of the layer thickness of the sliding layer to the layer thickness of the sliding paint layer can be at least almost 3:1.

It is also possible for the ratio of the layer thickness of the bearing metal layer to the layer thickness of the sliding layer to be selected from a range with a lower limit of 7:1 and an upper limit of 15:1 or said ratio can be at least almost 10:1, whereby the bearing metal layer need not have running properties but can contribute exclusively to the mechanical strength of the bearing element in addition to the protective layer. If necessary of course said bearing metal layer can have antifrictional properties.

Finally, it is also advantageous if the ratio of the layer thickness of the protective layer of the bearing metal layer is selected from a range with a lower limit of 7:1 and an upper limit of 15:1 or if the ratio of the layer thickness of the protective layer to the layer thickness of the bearing metal layer is at least almost 10:1, whereby a balanced ratio can be achieved on the one hand between the costs arising from the production of the bearing element to the mechanical strength of the bearing element.

It is particularly advantageous if lead-free materials are used for the individual layers at least apart from impurities, so that the bearing element is essentially lead-free, because in this way environmental pollution can be reduced.

The bearing element can be designed in particular as a sliding bearing half-shell, bearing bush or facing ring.

BRIEF DESCRIPTION OF THE DRAWINGS

For a better understanding of the invention the latter is explained in more detail with reference to the following figure. In a much simplified representation

DETAILED DESCRIPTION OF PREFERRED EMBODIMENTS

Figure 1:
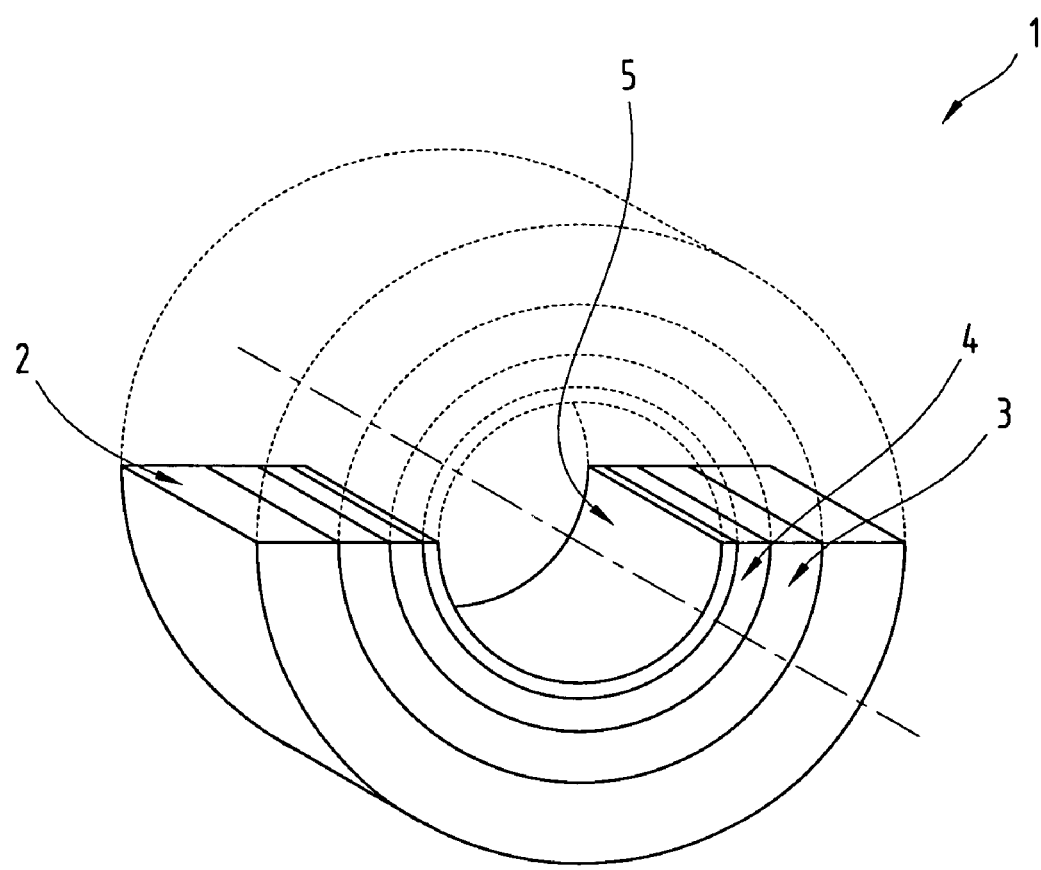
FIG. 1 shows a bearing element of the invention in the form of a sliding bearing half-shell.

First of all, it should be noted that the position details used in the description such as top, bottom, side etc. refer to the figure being described and illustrated at the time and if the position is changed should be adjusted to the new position. Furthermore, individual features or combinations of features of the various embodiments described can represent independent, inventive solutions.

All of the details relating to ranges of values in the present description should be understood such that the latter include any and all partial ranges, e.g. the range of 1 to 10 should be understood to include all partial ranges between the lower limit 1 and the upper limit 10, i.e. all partial ranges begin with a lower limit of 1 or more and end with an upper limit of 10 or less, e.g. 1 to 1.7 or 3.2 to 8.1 or 5.5 to 10.

The embodiments show possible variants of the bearing element, whereby it should be noted here that the invention is not restricted to the embodiments shown specifically but rather also diverse combinations of the individual embodiments are possible and this variability lies within the capability of a person skilled in this technical field using the teaching of the present invention. Also all possible variants, which are obtained by combining details of the embodiment variant shown and described, are covered by the scope of protection.

FIG. 1 shows a bearing element 1 according to the invention comprising a protective layer 2, a bearing metal layer 3, a sliding layer 4 and a sliding paint layer 5 applied over the latter in accordance with to the invention.

The protective layer 2 is usually made of steel, but can of course also be made of comparable materials which can provide the same or similar functions, in particular the mechanical strength of the bearing element 1. The mechanical strength of the entire bearing element 1 is dependent on the respective area of use, so that even copper alloys such as e.g. brass, bronze could be used. In addition, the bearing element 1 is given stability of form by the protective layer 2.

The bearing metal layer 3 arranged over this protective layer 2 is formed by a bearing metal alloy. This can consist e.g. of an alloy with an aluminium base, i.e. an aluminium matrix, in which at least one soft phase and/or at least one particle-shaped hard material can be embedded.

The at least one soft phase can be formed by at least one element from a first group comprising tin, antinomy, indium and bismuth. If necessary, it is possible for the bearing metal layer 3 to contain lead, but preferably lead-free alloys are used for this.

The hard particles can be formed e.g. from at least one element from a group comprising copper, manganese, zinc, cobalt, chromium, silicon, magnesium and iron or the elements scandium and/or zirconium. It is also possible for the hard particles to be formed by intermetallic phases which are formed for example between the latter elements or the elements with aluminium. It is also possible for at least a proportion of the hard particles to be formed by fibres.

Of course, any other soft phases and/or hard particles known from the prior art can be contained in the bearing metal alloy of the bearing metal layer 3.

The soft phase is known to be used to give the bearing element 1 antifricitonal properties when faults occur in the overlying sliding layer 4 or sliding paint layer 5 as a result of the operation of the bearing element 1, and thus the bearing metal layer 3 comes into contact at least almost directly with a component to be mounted such as e.g. a shaft. In this way the bearing element 1 is given the ability to embed the hard particles originating from wear as a result of using the bearing element 1. The hard particles give the aluminium alloy the required mechanical strength.

In particular alloys with a base of tin, bismuth, indium, lead or aluminium and alloys with a high-lead content base or a CuPb or AlSn or AlBi base are suitable for forming the bearing metal layer 3. In particular, high-tin containing tin base alloys are advantageous. Lead-free copper base alloys can also be used.

Copper base bearing metals are for example CuPb22Sn2, CuPb10Sn 10, CuPb15Sn7, CuSn6, CuSn4Zn. In particular, lead-free copper alloys with a CuAl, CuSn, CuZn, CuZnSn and CuBi base are advantageous as they are more environmentally friendly.

Tin base bearing metals that can be used are for example Sn8Cu4, SnSb12, $CU_6Pb$.

Lead base metals that can be used are for example PbSb10Sn6, PbSb15Sn10, PbSb15SnAs.

Aluminium base bearing metals can form e.g. AlSn40, AlSn20, AlSn25, AlSn10, AlSn6 etc.

It is also possible to use bearing metals with an AlZn base, such as e.g. AlZn4SiPb or an AlSi base such as e.g. AlSi11CuMgNi or an AlSnSi base such as e.g. AlSn20Si4.

The bearing metal layer 3 can be applied onto the protective layer 2, e.g. galvanically, by plating etc. as known from the prior art.

The sliding layer 4 is vapour deposited onto this twin or multiple layered structure by means of a sputtering method, for example from an aluminium alloy. Of course, other alloys or metals known from the prior art can be vapour deposited, as used conventionally in sputtering methods for this purpose, for example aluminium base alloy with lead and/or bismuth and/or indium and/or tin as alloy elements, copper base, silver base alloys with lead and/or bismuth and/or indium and/or tin, silver-lead-alloy or the like. The list of alloys that it is possible to use is not exhaustive and of course other alloys or mixtures than the ones mentioned can be used, whereby in particular preferably lead-free alloys are used.

As sputtering methods are known reference is made here to the relevant literature.

Alloys of this kind can contain aluminium in a range between 50 wt. % and 90 wt. %, for example in a range between 55 wt. % and 80 wt. %, preferably in a range between 60 wt. % and 79 wt. %, in particular in a range between 64 wt. % and 70 wt. % and can contain tin in a range between 5 wt. % and 45 wt. %, for example in a range between 10 wt. % and 39 wt. %, preferably in a range between 12 wt. % and 32 wt. %, in particular in a range between 17 wt. % and 20 wt. %. Other alloy elements such as e.g. manganese, iron, cobalt or the like can of course be included to form specific alloy phases, e.g. hard materials.

Further alloy elements would be e.g. Ag, Al, Fe, Cu, Ni, Sc, Si, Zn, Mn, Co, Cr, Zr, Mg.

Sliding bearings of this kind with the structure protective layer 2, bearing metal layer 3 and sliding layer 4 are already known from the prior art and reference is made here to the relevant literature to avoid unnecessary repetition. It should only be noted that the composition of the bearing metal layer 3 differs from that of the sliding layer 4.

According to the invention the sliding paint layer 5 is applied over the sliding layer 4. The latter can be applied by spreading or spraying or the like.

Preferably, the individual layers of the bearing element 1 are applied directly on top of one another, i.e. the bearing metal layer 3 directly on the protective layer 2 and/or the sliding layer 4 directly on the bearing metal layer 3 and/or the sliding paint layer 5 directly on the sliding layer 4. It is of course possible within the scope of the invention, for example if the adhesive strength of the individual layers is not sufficient, to arrange between the latter, i.e. for example between the protective layer 2 and the bearing metal layer 3 and/or the bearing metal layer 3 and the sliding layer 4 and/or the sliding layer 4 and the sliding paint layer 5 an additional functional layer, for example in the form of a bonding layer, e.g. made from a pure metal such as aluminium or an alloy, such as e.g. AlZn4.5 or even in the form of a barrier layer e.g. a nickel dam, in order to prevent the diffusion of individual alloy components between individual layers. These layers are also known from the prior art so need not be discussed further at this point.

The sliding paint layer 5 consists preferably mostly of a thermoplastic resin as already explained above. For example a polyamide imide resin can be used as the thermoplastic resin or at least one of the aforementioned thermoplastic resins. The resin can be present in at least one solvent, in particular an organic solvent such as e.g. xylol, whereby it processability can be improved. The amount of solvent can be selected from a range with a lower limit of 40 wt. % and an upper limit of 80 wt. %, in particular with a lower limit of 50 wt. % and an upper limit of 70 wt. %, preferably with a lower limit of 60 wt. % and an upper limit of 65 wt. %, relative to the proportion of resin, i.e. resin with solvent. Thus the proportion of dry resin, in particular the polyamide imide resin can be selected from a range with a lower limit of 20 wt. % and an upper limit of 50 wt. %, in particular a lower limit of 30 wt. % and an upper limit of 40 wt. %, preferably a lower limit of 35 wt. % and an upper limit of 37.5 wt. %. Relating to this a sliding paint layer 5 applied according to the invention can have for example a dry composition of 35 wt. % polyamide imide resin, 45 wt. % MoS₂ and 20 wt. % graphite, or a dry composition which is calculated from the given value ranges for the individual contents of the sliding paint layer 5.

Particularly preferably said sliding paint layer has at least one further additive in the form of a lubricant and/or hard material. It is possible for example to mix molybdenum disulphide and/or graphite with the polyamide imide resin particularly in the given ranges of amounts in order thus to increase the lubrication.

In order to avoid unnecessary repetition with respect to the composition of the sliding paint layer 5 or the thermoplastic resin for the sliding paint layer 5 reference is made to the above explanations.

The bearing element 1 according to the invention, which can be designed for example as shown in FIG. 1 as a sliding bearing half shell-as indicated by a dotted line in FIG. 1—and as a full bearing or as a facing ring or bearing bush or generally as a radial or axial bearing, is used mainly in the area of semifluid friction (according to the Stribeck curve). If for example edges or the like are formed on the surface of the element to be mounted, for example a shaft, this can result in a displacement to the so-called boundary friction area. By means of the bearing element 1 according to the invention, i.e. its sliding paint layer 5, it is possible, particularly if said sliding paint layer 5 has anisotropic mechanical properties, to shift the friction back into the more favourable semifluid frictional area. It is preferable in this case to use MoS₂ with a platelet-like disposition, as the latter MoS₂ particles have no affinity to one another, unlike conventional sliding elements or bearing elements with sliding layers with soft metals such as e.g. tin, in which the soft metal particles tend to be removed by decomposition at one point and at a different point of the sliding layer accumulate together due to the affinity of the soft phase particles, so that a kind of avalanche effect occurs with a reduction in the lubricating gap. For this reason according to the invention a sliding paint is preferably used which contains lubricants, for example MoS₂, which do not demonstrate this affinity.

Furthermore, preferably a platelet-like lubricant is used for the aforementioned reasons. However, it should be pointed out that it is not absolutely necessary as the objective of the invention is also achieved by means of a different lubricant, even though the use of platelet-like, sliding particles that are not affine to one another improves the properties of the bearing element 1.

The particles of the sliding paint layer 5 removed by abrasion or erosion, said layer also acting as a running-in layer, thus no longer bind themselves to the base and the particles are not dragged along which means that an almost constant lubricating gap can be provided throughout the lifetime of the bearing element 1.

It is also possible for the sliding paint layer 5 to have a Vickers hardness selected from a range with a lower limit of 20 HV and an upper limit of 45 HV or with a lower limit of 22 HV and an upper limit of 35 HV, in particular with a lower limit of 15 HV and an upper limit of 30 HV. In this way the sliding paint layer 5 is given sufficient strength as well as lubricating ability.

The lubricating layer 4 preferably has a Vickers hardness selected from a range with a lower limit of 60 HV, in particular 90 HV and an upper limit of 200 HV, in particular 130 HV.

It is also possible for the surface of the lubricating paint layer 5 to have an arithmetic average roughness Ra according to DIN EN ISO 4287, selected from a range with a lower limit of 0.02 μm and an upper limit of 1.5 μm or a lower limit of 0.5 μm and an upper limit of 1 m, in particular with a lower limit of 0.8 m and an upper limit of 0.9 μm. Furthermore, said surface of the lubricating paint or the lubricating paint layer 5 has a maximum roughness profile Rz according to DIN EN ISO 4287 selected from a range with a lower limit of 0.5 μm and an upper limit of 10 μm or a lower limit of 3 μm and an upper limit of 8 μm, in particular a lower limit of 5 μm and an upper limit of 6 μm. With this kind of topography of the sliding paint payer 5 the formation of a lubricating gap or oil gap is very uniform.

Finally, for form's sake it is noted that for a better understanding of the structure of the bearing element 1 the latter and its components have not been depicted wholly to scale and/have been enlarged and/or reduced in size.

LIST OF REFERENCE NUMBERS

1. Bearing element
2. Protective layer
3. Bearing metal layer
4. Sliding layer
5. Sliding paint layer

What is claimed is:

1. Bearing element comprising a protective layer, a bearing metal layer applied over the protective layer and a sliding layer applied by sputtering over the bearing metal layer, wherein a sliding paint layer is applied onto the sliding layer, and wherein the sliding paint layer has anisotropic mechanical properties.

2. Bearing element according to claim 1, wherein the sliding paint layer contains at least one thermoplastic resin as its main constituent.

3. Bearing element according to claim 2, wherein at least one thermoplastic resin is selected from a group comprising polyimides, polyamide imides, polyaryl ether imides, if necessary modified by isocyanates, phenolic resins, polyaryl ether-ether ketones, polyamides, epoxy resins, polytetrafluoroethylene, fluorine-containing resins, allylene suiphide, polytriazo-pyromellitic imides, polyester imides, polyaryl sulphides, polyvinyl sulphides, polysulphones, polyaryl sulphones, polyaryl oxides, mixtures and copolymers thereof.

4. Bearing element according to claim 2, wherein the proportion of resin in the sliding paint is selected from a range with a lower limit of 30 wt. % and an upper limit of 95 wt.%.

5. Bearing element according to claim 2, wherein the thermoplastic resin contains at least one additive, selected from a group comprising MoS₂, h-BN, WS₂, graphite, polytetrafluoroethylene, Pb, Pb—Sn alloys, CF₂, PbF₂, CrO₃, Fe₃O₄, PbO, ZnO, CdO, Al₂O₃, SiC, Si₃N₄, SiO₂, Si₃N₄, clay, talc, TiO₂, mullite, CaC₂, Zn, AlN, Fe₃P, Fe₂B, Ni₂B, FeB, ZnS, Ag₂S, CuS, FeS, FeS₂, Sb₂S₃, PbS, Bi₂S₃, CdS, fibres, as well as mixtures thereof.

6. Bearing element according to claim 5, wherein the additive is added in a proportion selected from a range with a lower limit of 5% and an upper limit of 30%.

7. Bearing element according to claim 5, wherein the at least one additive has a particle size selected from a range with a lower limit of 0.5 μm and an upper limit of 20 μm.

8. Bearing element according to claim 5, wherein at least one additive is formed by molybdenum disulphide with an average particle length selected from a range with a lower limit of 10 μm and an upper limit of 40 μm and an average width selected from a range with a lower limit of 10 μm and an upper limit of 40 μm and an average height selected from a range with a lower limit of 2 nm and an upper limit of 20 nm.

9. Bearing element according to claim 5, wherein at least one additive is formed by graphite with a particle size selected from a range with a lower limit of 2 μm and an upper limit of 8 μm.

10. Bearing element according to claim 1, wherein the sliding paint layer contains at least one additive which has a platelet-shaped disposition.

11. Bearing element according to claim 1, wherein the sliding paint layer is designed to have a layer thickness selected from a range with a lower limit of 2 μm and an upper limit of 40 μm.

12. Bearing element according to claim 1, wherein the sliding paint comprises a polyamide imide resin, molybdenum disulphide ($MoS_2$) and graphite, whereby the proportion of the polyimide resin with solvent is selected from a range with a lower limit of 60% and an upper limit of 80%, the proportion of $MoS_2$ is selected from a range with a lower limit of 15% and an upper limit of 25% and the proportion of graphite is selected from a range with a lower limit of 5% and an upper limit of 15%.

13. Bearing element according to claim 12, wherein a ratio of $MoS_2$ to graphite is selected from a range with a lower limit of 1.5:1 and an upper limit of 4.5:1.

14. Bearing element according to claim 1, wherein the sliding layer is designed to have a layer thickness selected from a range with a lower limit of 10 μm and an upper limit of 30μm.

15. Bearing element according to claim 1, wherein the ratio of the layer thickness of the sliding layer to the layer thickness of the sliding paint layer is selected from a range with a lower limit of 2:1 and an upper limit of 5:1.

16. Bearing element according to claim 1, wherein the ratio of the layer thickness of the bearing metal layer to the layer thickness of the sliding layer is selected from a range with a lower limit of 7:1 and an upper limit of 15:1.

17. Bearing element according to claim 1, wherein a ratio of the layer thickness of the protective layer to the layer thickness of the bearing metal layer is selected from a range with a lower limit of 7:1 and an upper limit of 15:1.

18. Bearing element according to claim 1, wherein the individual layers are lead-free at least apart from impurities.

19. Bearing element according to claim 1, wherein the latter is designed as a sliding bearing half-shell or bearing bush or facing ring.

\* \* \* \* \*

UNITED STATES PATENT AND TRADEMARK OFFICE
CERTIFICATE OF CORRECTION

PATENT NO. : 7,541,086 B2  Page 1 of 1
APPLICATION NO. : 11/522033
DATED : June 2, 2009
INVENTOR(S) : W. Gärtner et al.

It is certified that error appears in the above-identified patent and that said Letters Patent is hereby corrected as shown below:

In particular, in Column 10, line 52, (Line 7 of Claim 5) please change "$Sb_2s_3$"

to correctly read:  --$Sb_2S_3$--.

Signed and Sealed this

Twenty-fifth Day of August, 2009

David J. Kappos
*Director of the United States Patent and Trademark Office*